United States Patent [19]
Padgett et al.

[11] Patent Number: 5,774,215
[45] Date of Patent: Jun. 30, 1998

[54] REDUCED COMPLEXITY FOURIER TRANSFORM SPECTROMETER

[75] Inventors: Miles John Padgett, Cambridge, England; Wilson Sibbett, St Andrews, Scotland; Johannes Courtial, Veitschochheim, Germany; Brett Alexander Patterson, Norwood, Australia

[73] Assignee: Siemens plc, Bracknell, England

[21] Appl. No.: 709,296

[22] Filed: Sep. 9, 1996

[30] Foreign Application Priority Data

Sep. 12, 1995 [GB] United Kingdom .................. 9518603

[51] Int. Cl.⁶ .................................................. G01B 9/02
[52] U.S. Cl. ........................................ 356/346; 356/351
[58] Field of Search ..................... 356/346, 351

[56] References Cited

U.S. PATENT DOCUMENTS

| | | | |
|---|---|---|---|
| 3,881,105 | 4/1975 | De Long et al. | 356/351 |
| 4,320,973 | 3/1982 | Fortunato et al. | 356/346 |
| 4,732,481 | 3/1988 | Matsui et al. | 356/346 |
| 4,814,604 | 3/1989 | Lequime | 356/351 |
| 4,867,565 | 9/1989 | Lequime | 356/346 |

FOREIGN PATENT DOCUMENTS

| | | |
|---|---|---|
| 2 294 778 | 1/1995 | United Kingdom . |
| WO95/02171 | 1/1995 | WIPO . |

*Primary Examiner*—Frank G. Font
*Assistant Examiner*—Jason D. Vierra-Eisenberg
*Attorney, Agent, or Firm*—Evenson, McKeown, Edwards & Lenahan, P.L.L.C.

[57] ABSTRACT

A Fourier transform spectrometer for use, among others, for sensing gases or liquids includes two polarizers, a birefringent optical component interposed between the two polarizers and a detector. Light from an extended source is substantially polarized by a first of the two polarizers, split into divergent beams by the birefringent optical component, and again caused to converge by the birefringent optical component so that, after passing through a second of the two polarizers, the light forms an interferogram in a plane behind the birefringent optical component where the detector is situated. The Fourier transform spectrometer is thereby provided with a way of forming an interferogram of the light from the extended source without a lens or a second birefringent optical component. This improves the field of view of the spectrometer and is likely to reduce its cost.

9 Claims, 2 Drawing Sheets

REDUCED COMPLEXITY FOURIER TRANSFORM SPECTROMETER

BACKGROUND OF THE INVENTION

1. Field of the Invention

The present invention relates to Fourier transform spectrometers, used to generate data appertaining to the spectrum of a light source. More especially, but not exclusively, it relates to Fourier transform spectrometers which may be used to sense the presence of a specific gas or liquid, in dependence upon the spectrum of light which has passed through the gas or liquid.

2. Description of Related Art

The detection of specific gases or liquids is an important requirement in some refining and manufacturing processes. For example this requirement might be for the detection of harmful by-products which may be produced as a result of such processes.

One known technique for sensing the presence of a gas or liquid is to use a spectrometer to generate data appertaining to the spectrum of light entering the spectrometer after it has passed through the gas or liquid, since a gas or liquid may be characterized by the particular frequency or frequencies of light which it absorbs. By comparing data appertaining to the spectrum of light in the absence of the gas or liquid, with the data in its presence, it is possible to sense the gas or liquid. Furthermore, with knowledge of the frequency of light absorbed by a specific gas or liquid the sensed gas or liquid may be identified.

Until recently Fourier transform spectrometers were fragile and expensive items of equipment demanding the use of optimal components manufactured to within high tolerances. This is because such spectrometers were based on the Michelson interferometer. The Michelson interferometer forms an interferogram from a point light source and causes two coherent beams of light derived from the point light source to interfere with each other. By varying a path difference between the two beams, an interferogram is formed, which represents an intensity auto-correlation of the light source. A Fourier transform of the interferogram results in the generation of data appertaining to the spectrum of the light source.

The path difference between the two light beams is achieved by mechanical movement of optical components, which makes a Michelson interferometer fragile and therefore inappropriate for the industrial applications hereinbefore mentioned. However recent known advances have been made through a use of birefringent optical components to provide one development of a Fourier transform spectrometer by providing a way of forming an interferogram without mechanical movement. Such a Fourier transform spectrometer is described in U.S. Pat. No. 4,732,481, the inventors of which are Matsui et al. This patent is hereinafter referred to as the Matsui patent.

As is well known to those skilled in the art, a birefringent material possesses the characteristic that an unpolarized beam of light entering the material is split into two orthogonally polarized components, known respectively as the ordinary and extraordinary components, due to the fact that one of the two components travels faster through the birefringent material than the other of the two components.

The Matsui patent teaches that a Fourier transform spectrometer may produce a interferogram using a birefringent optical component with a Wollaston prism, which is used to split a beam of light into two components which travel through the Wollaston prism at different speeds, and which follow diverging paths where they leave the prism. The Wollaston prism thereby provides the spectrometer with a way of introducing a path difference between two beams of light without a requirement for mechanical movement of optical components.

As is well known to those skilled in the art, a Wollaston prism is an optical component including two wedges of contiguously juxtaposed birefringent material, so that light is split into ordinary and extraordinary polarized beams in a first of the two wedges, and which follow a common path in the first birefringent wedge, but where incident with an interface between the first and second wedges, diverge by equal and opposite angles with respect to the path. Hence the ordinary and extraordinary beams emerge from the second wedge of the Wollaston prism following diverging paths.

In the Matsui patent the light emerging from the Wollaston prism is passed through a second polarizer, which facilitates the provision of similarly polarized beams which can mutually interfere. However to form an interferogram a lens must be used to focus the light beams onto a plane in which a detector is situated.

A disadvantage with the spectrometer disclosed in the Matsui patent is that it uses a lens to form the interferogram. This is because, to be effective the lens must have a relatively long focal length, compared with other optical components from which the spectrometer is fabricated. This results in the spectrometer being relatively large and bulky. A further disadvantage is that the spectrometer is inappropriate for use with an extended light source.

As is known to those skilled in the art, light passing through an aperture from an extended light source will include beams of light which have a plurality of incident angles subtended from a plane in which the aperture lies, whereas light from a point source will include beams of light which have the same angle of incidence subtended from the plane of the aperture.

An optical instrument which utilizes light from an extended source has the advantage that the amount of light from that source which the instrument can use will be considerably greater than the amount which can be used by an optical instrument only capable of utilizing light from a point source.

A further known development of the Fourier transform spectrometer is to use a second birefringent optical component to cause diverging light emerging from a first Wollaston prism to converge on to a detector, obviating the need for a lens with a long focal length. Such a Fourier transform spectrometer is disclosed in our co-pending patent application numbered PCT/GB94/01499 to which attention is hereby drawn. The use of a second birefringent component results in a significant reduction in the size of the Fourier transform spectrometer. Furthermore, the cost of a suitable birefringent optical component is likely to be relatively small compared to that of a suitable lens. A yet further advantage with our improved spectrometer is that it facilitates the formation of an interferogram from light from an extended light source, since it has an extended field of view.

The term field of view is known to those skilled in the art to mean the maximum area at a given range which can be seen through an optical instrument. The field of view is an important factor in the design of an optical instrument because it determines the amount of light from an available source, and the maximum angle of incidence of that light, which the instrument can use.

SUMMARY OF THE INVENTION

It is an object of the present invention to provide a Fourier transform spectrometer with an improved field of view.

According to the present invention there is provided a Fourier transform spectrometer comprising first and second polarizers, a birefringent optical component interposed between the first and the second polarizers and a detector. Polarization axes of the first and second polarizers are aligned so that they are substantially 45° to optic axes of the birefringent optical component. The construction of the birefringent optical component is such that light from an extended source polarized by the first polarizer, is split into divergent beams by the birefringent optical component, and thereafter caused to converge by the said component so that, after passing through the second polarizer, the light forms an interferogram in a plane in which the detector is situated.

Thus an interferogram of light from the extended source is thereby formed without a lens or a second birefringent optical component.

As will be appreciated by those skilled in the art, a way of increasing the field of view of a Fourier transform spectrometer based on birefringent optical components is to reduce the optical thickness of the birefringent optical components. As previously explained, known Fourier transform spectrometers include birefringent optical components which operate to split the ordinary and extraordinary beams so that they follow divergent paths, thereby requiring a lens or a second birefringent component to cause the beams to converge. By using a birefringent optical component which both splits the beams into divergent paths, and which thereafter causes the beams to converge after passing through the birefringent optical component, the need for a second birefringent optical component or a lens to form the interferogram is obviated. The optical thickness of the resulting Fourier transform spectrometer is therefore considerably reduced, improving the field of view and possibly reducing the cost of the spectrometer.

The birefringent optical component may comprise first and second contiguously juxtapositioned birefringent wedges so that the optic axis of the said first wedge is inclined at an angle subtended from planes perpendicular to an optical axis of the birefringent optical component and so that the optic axis of the second wedge is substantially perpendicular to the optical axis of the birefringent optical component, thereby causing light to split into two orthogonally polarized beams following diverging paths in the first wedge, and thereby causing the two beams to converge after passing through the second wedge, so that they interfere in the plane behind the birefringent optical prism, at which the detector is situated.

As is well known to those skilled in the art the optic axis of a birefringent crystal is the axis along which light travels at a velocity which is independent of polarization of the light. The term optical axis is hereby stated to mean a conceptual reference line between two points one on a front and the other on a rear face of an optical component.

The plane in which the detector is situated, may be inclined at an angle subtended from planes perpendicular to the optical axis of the birefringent component.

The detector means may include a plurality of detectors which serve in combination to generate data appertaining to an interferogram.

The detector may be formed of a linear detector arrangement.

The detector may be a camera.

The camera may be a CCD camera.

The camera may be a television camera.

The Fourier transform spectrometer, may further include a data processor responsive to the detector for generating data appertaining to the spectrum of light entering the spectrometer in accordance with a Fourier transform of the interferogram detected by the detector, a data store being connected to the data processor for storing data appertaining to the spectrum, and for storing further data appertaining to predetermined spectra of light, so that identification of a specific gas or liquid through which light entering the spectrometer has passed is facilitated by comparing data appertaining to the spectrum with the further data.

BRIEF DESCRIPTION OF THE DRAWINGS

One embodiment of the present invention will now be described by way of example only, with reference to the accompanying drawings, in which:

FIG. 2b is a somewhat conceptual illustration of an interferogram formed on a detector of the Fourier transform spectrometer shown in FIG. 2a.

DESCRIPTION OF THE PREFERRED EMBODIMENT

Figure 1:
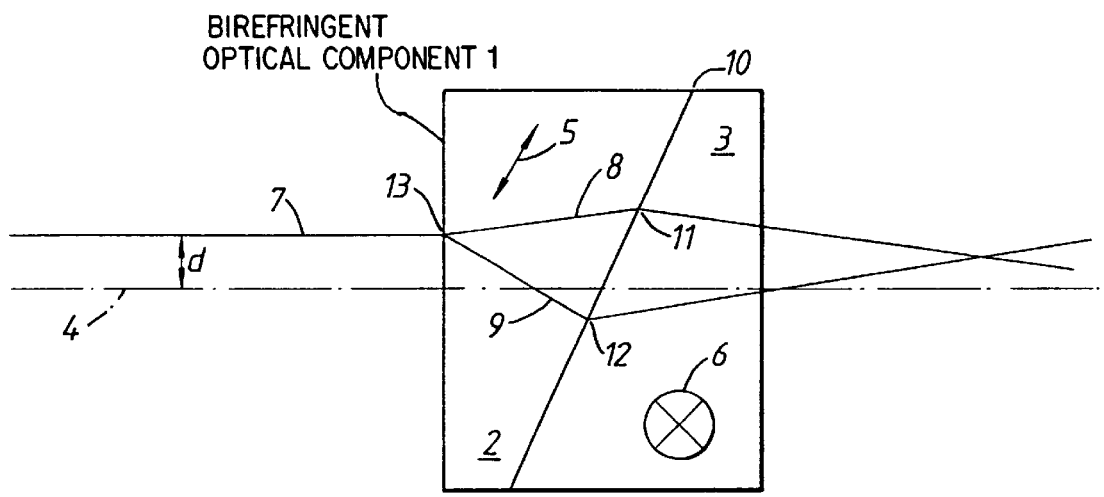
FIG. 1 is a somewhat schematic diagram of a birefringent optical component.

A Fourier transform spectrometer embodying the present invention may be constructed from a birefringent optical component, as shown in FIG. 1. The birefringent optical component 1, shown in FIG. 1, includes two contiguously juxtapositioned birefringent wedges 2 and 3. These two wedges 2 and 3, may be fabricated from a suitable birefringent optical material such as calcite, rutile, quartz or lithium niobate. The birefringent wedge 2, is fabricated so that its optic axis is inclined at an angle subtended from a plane perpendicular to the optical axis 4, of the birefringent optical component 1. The orientation of the optic axis of the first birefringent wedge 2, is indicated by an arrow 5. The second birefringent wedge 3, is fabricated so that its optic axis is perpendicular to the optical axis 4, of the birefringent optical component 1. This is indicated by the sign 6, shown in the second birefringent wedge 3.

As known by those skilled in the art, the sign 6, indicates that the orientation of the optic axis of an optical component is perpendicular to the plane in which the drawing lies.

As already explained, a birefringent material polarizes incident light into two orthogonal components, which are known as the ordinary and the extraordinary components. The effect of fabricating the two birefringent wedges 2 and 3, as aforementioned, is that a beam of light 7, which is incident on the first wedge 2, is split into two paths 8 and 9, one of which is followed by the ordinary component, the other of which is followed by the extraordinary component. After passing through the first birefringent wedge 2, light following a first of the two paths 8, is incident on the interface 10, between the first and second birefringent wedges 2 and 3, at a point 11, whereas light following a second of the two paths 9, is incident on the interface 10, at a second point 12, which is separate and displaced from the first point 11.

As a result of the construction of the optical component 1, the interface 10, between the two birefringent wedges 2 and 3, is inclined at an angle subtended from a plane perpendicular to the optical axis 4, of the birefringent component 1. This results in the phase difference between the beams of light following the two paths 8 and 9, changing in proportion to a distance d, between the point 13, whereat the beam of light 7, is incident on the first birefringent wedge 2, and the optical axis 4, of the optical component 1.

Light following each of the two paths 8 and 9, experiences a deviation at the points 11 and 12, which causes the light following the two paths to converge after passing through the second wedge 3. Hence the birefringent optical component 1, is constructed so that light passing through the optical component 1, will form a local fringe plane behind the component 1, provided that the polarization of the two light beams at the fringe plane is the same.

Figure 2A:
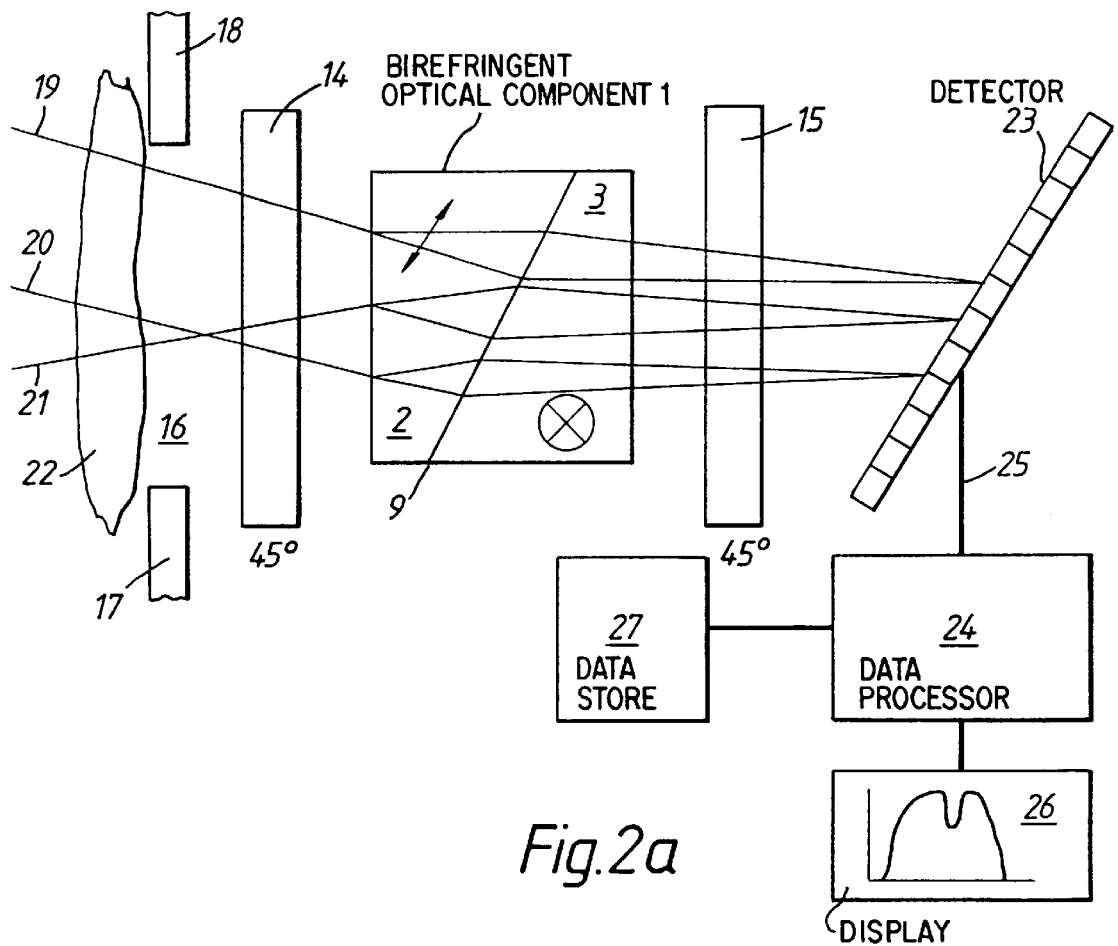
FIG. 2a is a somewhat schematic diagram of a Fourier transform spectrometer used to identify a specific gas or liquid.

A Fourier transform spectrometer embodying the birefringent component 1, is shown in FIG. 2a. In FIG. 2a, parts of the birefringent optical component as shown in FIG. 1 bear the same numerical designations. The birefringent component 1, is shown in FIG. 2a as being interposed between two polarizers 14 and 15. Light passing through an aperture 16, is polarized by a first of the two polarizers 14, so that when the polarized light is incident on the birefringent component 1, it is polarized at an angle of 45° to the optic axis of the first birefringent wedge 2.

The aperture 16, is formed by a hole in a screen surrounding the spectrometer. Opposite sides 17 and 18, of the aperture 16, which are formed by the screen are shown in FIG. 2a. The aperture 16, is arranged to be wide enough to allow light from a source which is formed of light beams which have a plurality of angles of incidence to a plane in which the aperture 16 lies. As already explained, a source of such light is known as an extended light source. As an illustration, three beams of light 19, 20 and 21, which pass through the aperture 16, are shown in FIG. 2a to have different angles of incidence.

After passing through the polarizer 14, the light beams 19, 20 and 21, pass through the birefringent optical component 1, which causes the light to form a local fringe plane on a detector 23, after passing through a second of the two polarizers 15. The second polarizer 15, polarizes the light emerging from the birefringent component 1, so that it is 45° to the optic axis of the second wedge 3. The polarization introduced by the second polarizer 15, facilitates the provision of similarly polarized beams which will form an interferogram on the detector 23.

As illustrated in FIG. 2a, the detector 23 is inclined at an angle subtended from planes perpendicular to the optical axis. This is because, it is a feature of the construction of the birefringent optical component as previously described, that the local fringe plane formed by the optical component is at an angle subtended from a plane perpendicular to the optical axis of the optical component.

The interferogram is detected by the detector 23, which produces data representative of the interferogram, in accordance with the intensity of light comprising the interferogram, as it varies across the detector 23. This data is received by a data processor 24, via a conductor 25, which performs a Fourier transform of the data, thereby generating data representative of the spectrum of the light entering the spectrometer. Such data may be presented for review by an operator on a display means 26.

As already explained, the polarization of the light passing through the first and second polarizers 14, 15, is arranged to be at an angle of 45° to the optic axis of the first and second birefringent wedges 2 and 3, respectively. This arrangement causes the intensity of the light in each of the two paths within the birefringent optical component to be equal. This is because where the light enters the first birefringent wedge 2, it is polarized into the ordinary and extraordinary polarized components, one of which is parallel with the orientation of the optic axis of the wedge 2, and the other of which is polarized to 90° from the angle of orientation of the optic axis. To ensure each of the ordinary and extraordinary components have the same intensity, the first polarizer must polarize the light to 45° to the optic axis. Likewise cause the two components of light forming the interferogram to have the same intensity, the second polarizer must have a polarization axis which is 45° to both the in-phase component and the component which is polarized at 90° to the optic axis of the second wedge 3.

As a result of the presence of the gas sample 22, in front of the aperture 16, light entering the spectrometer will have passed through the gas sample 22. The spectrum of light will therefore have been changed in accordance with the characteristic frequency or frequencies of light energy absorbed by the gas sample 22. A data store 27, is used to store data representative of a reference spectrum of light, measured in the absence of the gas sample 22. The spectrometer is thereby provided with a way by which the data processor 24 may identify the gas sample 22, in accordance with the characteristic frequency of light absorbed by the gas, from a comparison of the spectrum of light detected in the presence of the gas sample 22, with that of the reference spectrum.

Figure 2B:
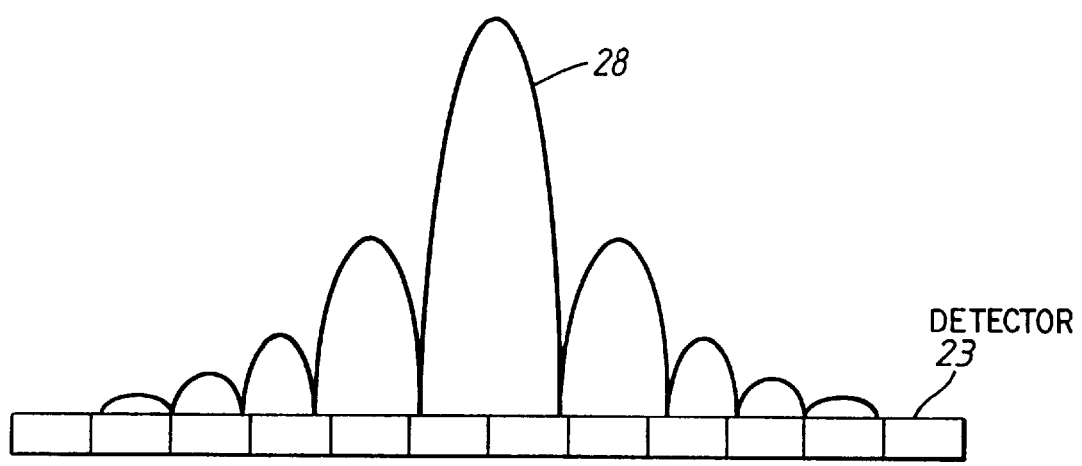

A representation of a conceptual form of an interferogram showing the distribution of the intensity of light across the detector 23, is shown in FIG. 2b, wherein corresponding parts of the detector array shown in FIG. 2a bear the same numerical designations. In FIG. 2b, the intensity of the light forming the interferogram is represented by a shaded grey area 28, as it varies across the detector 23.

The detector 23, as shown in FIGS. 2a and 2b, includes a linear array of detector elements, each of which generates data corresponding to the intensity of light falling on that particular element. However it will be readily appreciated by those skilled in the art that the detector 23, may include any form of detector arrangement wherein a plurality of detectors work in combination to generate data representative of the interferogram. Equally the detector 23, could be a camera, such as a CCD camera or a television camera.

What we claim is:

1. Fourier transform spectrometer for use in detecting a composition of a gas or liquid sample from light absorbed by said sample, comprising first and second polarizers, a birefringent optical component interposed between the first and the second polarizers and a detector, wherein polarization axes of the first and second polarizers are aligned so that they are substantially 45° to optic axes of the birefringent optical component, said birefringent optical component comprising first and second contiguously juxtapositioned birefringent wedges, the optic axis of the said first wedge being inclined at an angle subtended from planes perpendicular to an optical axis of the birefringent optical component and the optic axis of the second wedge being substantially perpendicular to the optical axis of the birefringent optical component, so that light entering the spectrometer after passing through said sample is polarized by said first polarizer and is caused to split into two orthogonally polarized beams following diverging paths in the first wedge, and to converge after passing through the said second wedge, so that two polarized beams interfere in a plane behind the birefringent optical prism, where the detector is situated.

2. A Fourier transform spectrometer as claimed in claim 1, wherein the plane in which the detector is situated is inclined at an angle subtended from planes perpendicular to the optical axis of the birefringent optical component.

3. A Fourier transform spectrometer as claimed in claim 2, wherein the detector comprises a plurality of detectors which serve in combination to generate data appertaining to an interferogram.

4. A Fourier transform spectrometer as claimed in claim 3, wherein the detector comprises a linear detector arrangement.

5. A Fourier transform spectrometer as claimed in claim 3, wherein the detector is part of a camera.

6. A Fourier transform spectrometer as claimed in claim 5, wherein the camera is a CCD camera.

7. A Fourier transform spectrometer as claimed in claim 5, wherein the camera is a television camera.

8. A Fourier transform spectrometer as claimed in any preceding claim, further comprising a data processor responsive to the detector for generating data appertaining to the spectrum of light entering the said spectrometer in accordance with a Fourier transform of the interferogram detected by the detector, a data store being connected to the data processor for storing data appertaining to the said spectrum, and for storing further data appertaining to predetermined spectra of light, whereby identification of a specific gas or liquid sample through which light entering the said spectrometer has passed is facilitated by comparing data appertaining to the said spectrum with the said further data.

9. The Fourier transform spectrometer as claimed in claim 1, wherein only a single birefringent optical component is interposed between the first and second polarizers.

* * * * *